United States Patent
Chandraker (10) Patent No.: US 7,210,904 B2
(45) Date of Patent: May 1, 2007

(54) RUNNER BLADE FOR LOW SPECIFIC SPEED FRANCIS TURBINE

(75) Inventor: A. L. Chandraker, Hyderabad (IN)

(73) Assignee: Bharat Heavy Electricals Ltd. (IN)

( * ) Notice: Subject to any disclaimer, the term of this patent is extended or adjusted under 35 U.S.C. 154(b) by 157 days.

(21) Appl. No.: 10/901,659

(22) Filed: Jul. 29, 2004

(65) Prior Publication Data

US 2005/0249594 A1  Nov. 10, 2005

(30) Foreign Application Priority Data

May 5, 2004  (IN) .......................... 823/DEL/2004

(51) Int. Cl.
*F03B 3/02* (2006.01)

(52) U.S. Cl. .................. 415/206; 416/DIG. 3

(58) Field of Classification Search ............. 415/206, 415/208.3, 183, 185, 198 A, DIG. 2, DIG. 5
See application file for complete search history.

(56) References Cited

U.S. PATENT DOCUMENTS

| | | | | |
|---|---|---|---|---|
| 1,509,653 | A | * | 9/1924 | Kaplan .................. 416/248 |
| 2,042,064 | A | * | 5/1936 | Kugel .................... 416/188 |
| 3,440,969 | A | * | 4/1969 | Masukichi ............. 416/242 |
| 3,610,775 | A | * | 10/1971 | Swearingen ........... 416/186 R |
| 3,964,841 | A | * | 6/1976 | Strycek ................. 416/186 R |
| 3,973,872 | A | * | 8/1976 | Seleznev et al. ....... 415/208.3 |
| 4,274,810 | A | * | 6/1981 | Nishikawa ............ 416/186 R |
| 6,135,716 | A | * | 10/2000 | Billdal et al. .......... 416/183 |
| 6,217,285 | B1 | * | 4/2001 | Kurokawa et al. ..... 416/186 R |
| 6,338,610 | B1 | * | 1/2002 | Harada et al. ......... 416/186 R |

* cited by examiner

*Primary Examiner*—Igor Kershteyn
(74) *Attorney, Agent, or Firm*—The Webb Law Firm (57) ABSTRACT

A runner for use as retrofit in existing Francis turbine water path includes a set of nine profiles covering crown (hub) to skirt (band) area is to produce power efficiently at deteriorated head condition of site. Each of the nine profiles is made of two curves, namely pressure and suction curves, meeting at two ends denoted as leading and trailing edge points. The runner exhibits better performance at specific speed value (ns,m) from 83 to 98, than the existing runner.

5 Claims, 8 Drawing Sheets
(5 of 8 Drawing Sheet(s) Filed in Color)

Meridional Passage of a Runner (r-z coordinate system)

FIG. 1A. Typical Universal Characteristcis of a Francis Turbine

FIG. 1B. Existing and Suggested Typical Iso-efficiency Contours

FIG. 2A. Meridional Passage of a Runner (r-z coordinate system)

FIG. 2B. MERIDIONAL PASSAGE & QUASI-STREAMLINES

FIG. 3. Runner Profiles from Prior Art (x-y coordinate system)

FIG. 4A. Invented Runner Profiles (x-y coordinate system)

FIG. 6. Mean Profile Section (prior art & invented)

FIG. 7. Skirt (band) Profile Section (prior art & invented)

FIG. 8. Three Dimensional View of Invented Blade(x-y-z co-ordinate system)

FIG. 9. Pressure loading over the crown section
(prior art profile & invented profile)

FIG. 10. Pressure loading over the skirt section (prior art profile & invented profile)

FIG. 11A CFD Simulation of Surface Pressure Distribution (skirt not shown)

RUNNER BLADE FOR LOW SPECIFIC SPEED FRANCIS TURBINE

FIELD OF INVENTION

This invention relates to a runner blade for low specific speed Francis turbine.

BACKGROUND OF THE INVENTION

Conventionally the reaction hydraulic turbine consists of spiral casing (or scroll case), stay vane, guide vane, runner and draft tube in that order. Runner also known as impeller is the only rotating passage. Mixed flow hydraulic turbine where the runner inlet flow is radial and runner exit flow is predominantly axial in direction is known as Francis turbine. The runner which is characterized by a large number of blades (usually 11–19), equally spaced circumferentially around the turbine axis; converts hydraulic energy (water head) into mechanical energy. It is called reaction turbine by definition if the pressure drop across the runner alone is more than 60% of the pressure drop occurring across the total water path (spiral casing to draft tube). Francis turbines with various kind of water path are used in practice for a range of specific speed ns, m=70–400 and head range H=50–500 m; or alternatively for a range of unit discharge q11=150–1350 liter/second, and unit speed n11=40–130 rpm. The hydraulic efficiency η (or eta) for prototype runner is expected to be in the range of 90–95%. A runner is designed to be site specific i.e. for a limited range of unit discharge q11: design unit discharge +−100 liters per second (lps) and fixed unit speed n11 based on runner diameter (D or d1), machine speed (n) rpm and rated head H (m); to provide efficient and cavitation free characteristics. The characteristic dimensions are defined as:

Unit speed; $n11=(n*D)/\sqrt{H}$

Unit discharge; $q11=q/(D^2\sqrt{H})$

Specific speed; $ns,m=n\sqrt{Pkw}/H^{5/4}$

Hydraulic efficiency; eta or $\eta=1000*Pkw/(rho*g*q*H)$

Where q is discharge in lps (liter/second), Pkw is power developed (in KW) by the turbine, rho (998.2) and g (9.81) are water density and acceleration due to gravity.

Figure 1A:
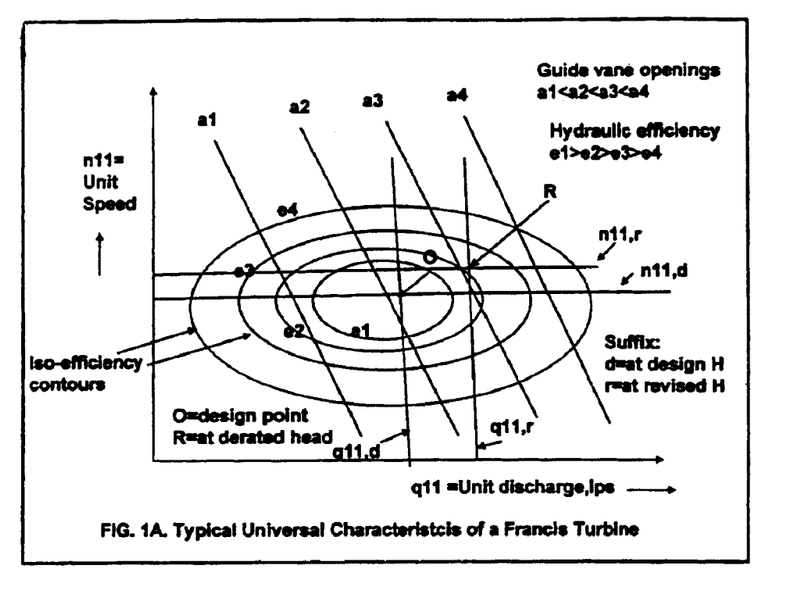
FIG. 1A Typical universal characteristics of a Francis Turbine

A typical turbine characteristics are plotted as shown in FIG. 1A of the accompanying drawings showing efficiency iso-contours e1, e2 . . . optimum guide vane openings a1, a2 . . . as function of unit discharge q11 and unit speed n11.
Note:
Guide vane openings: a1<a2<a3<a4 . . .
Hydraulic efficiency (eta); e1>e2>e3>e4 . . .

Figure 1B:
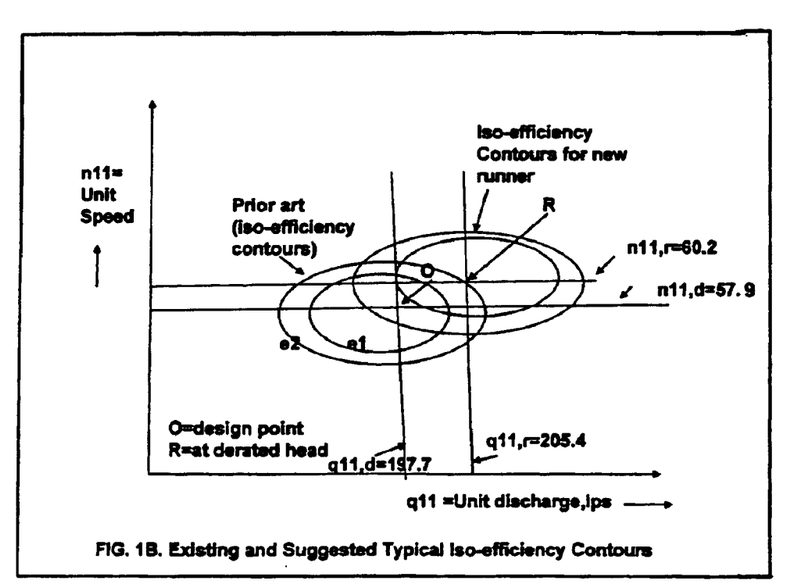
FIG. 1B Existing and suggested typical iso-efficiency contours.
Figure 2A:
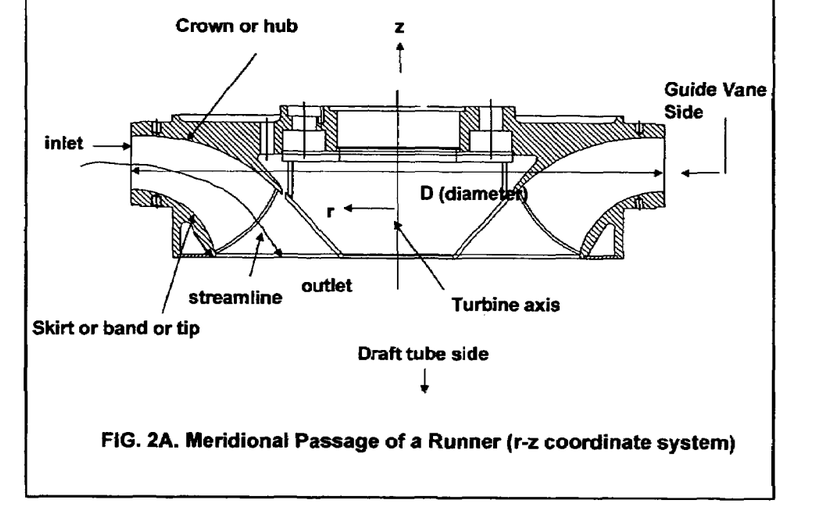
FIG. 2A Meridional passage of a runner (r-z coordinate system).
Figure 2B:
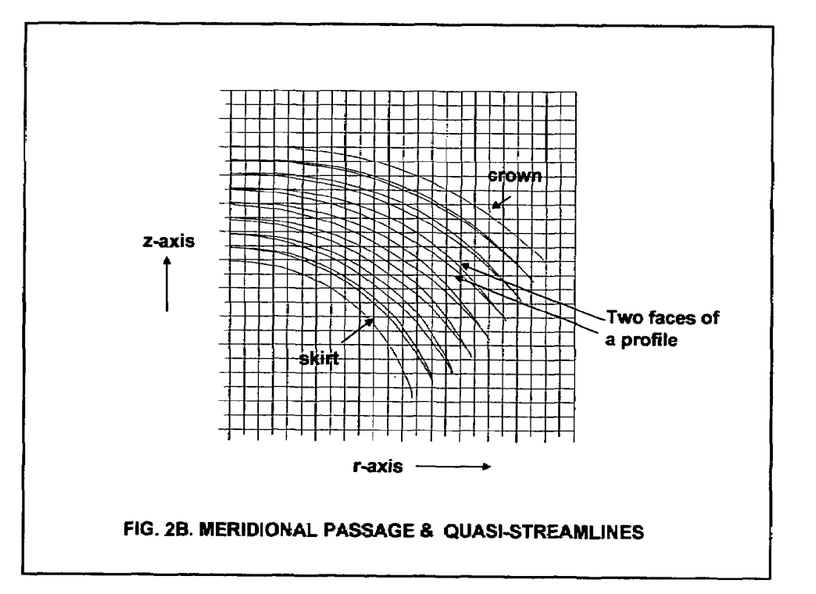
FIG. 2B Meridional passage and Quasi-streamlines
Figure 3:
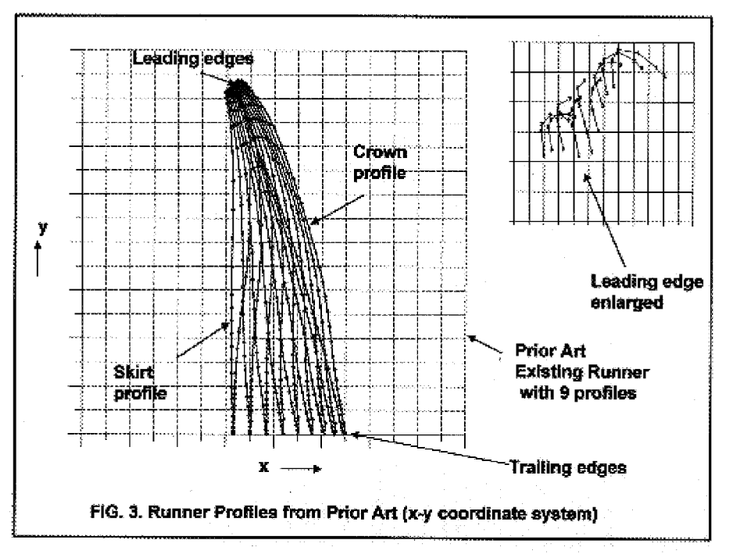
FIG. 3 Runner profiles from prior art (x-y coordinate system)

For a unit design speed, say n11,d a turbine is designed to deliver q11,d at operative point 'O' (FIG. 1a). Usually the turbine is expected to operate around print 'O' within q11,d±100 lps efficiently. With the years of operation, the head deteriorates significantly, hence operating point shift to lesser efficient location say R. The point R is at higher discharge and at slightly higher n11 at lower efficiency point, resulting into lesser turbine power. New hydro power plant needs huge investment hence designer seeks for renovation and modernization of existing plant with minimum investment. Retrofitting runner is an obvious cost-effective first choice. The aim of the invention is to develop a new runner which has got optimum efficiency near new operating point R (FIG. 1B), and suit existing water path and retaining stationary components of hydraulic paths (viz. Spiral casing, guide vane, draft tube and stay vane).

George E. Hecker & Willem Jansen have described turbine having 2 or more runner blades each having a Cork Screw configuration (U.S. Pat. No. 5,997,242; Dec. 7, 1999). One wicket gate configuration for hydraulic turbine is proposed by A Gokhman (U.S. Pat. No. 5,441,384; Aug. 15, 1995). David G. Homes et. al has proposed blade configuration for Francis runner for improved cavitation-free performance (U.S. Pat. No. 4,379,757; Oct. 30, 1984). Benno Buchelt has proposed a blade for Kaplan turbine (U.S. Pat. No. 6,007,297, Dec. 28, 1999). The reported work by Kurokawa et al. (U.S. Pat. No. 6,217,285 B1; Apr. 17, 2001) and Strycek et al. (U.S. Pat. No. 3,964,841; Jun. 22, 1976) concerning the design of centrifugal blower, fan and pump for flow discharge as output. They are not meant for turbine application where power is output. The work by Billdal et al. (U.S. Pat. No. 6,135,716; Oct. 24, 2000) proposed impeller for turbine with leaning of leading and trailing edges with respect to hub and shroud, respectively, in the direction of rotation. Harada et al. (U.S. Pat. No. 6,338,610 B1; Jan. 15, 2002) propose impeller for discharge as output with secondary flow loss reduction as goal by providing leaned blade. Nishikawa (U.S. Pat. No. 4,274,810; Jun. 23, 1981) proposes blade for fan application. Centrifugal compressor for discharge as output is proposed by Seleznev et al. (U.S. Pat. No. 3,973,872; Aug. 10, 1976). Swearingen (U.S. Pat. No. 3,610,775; Oct. 5, 1971) is for impeller to work with flow motion in gaseous medium entrained with liquid and solid particles. Kugel (U.S. Pat. No. 2,042,064; May 26, 1936), Kaplan (U.S. Pat. No. 1,509,653; Sep. 23, 1924) and Konda M. (U.S. Pat. No. 3,440,969; Apr. 29, 1969) deal with various constructional features of runners for centrifugal flow machines. The present invention relates to design of new runner blade consisting of blade profiles with reduced plan angle for retrofit work to existing mixed flow machines Francis turbine) water paths, to suit deteriorated head.

OBJECTS OF THE INVENTION

An object of the present invention is to propose a new runner blade with 9 profile sections suitable to meet new unit discharge and speed more efficiently than the known art.

Another object is to propose an efficient runner blade to fit with existing water path, i.e. retaining crown, skirt, inlet and outlet boundaries.

Still another object of this invention is to propose a new runner is better than prior art runner for higher unit discharge and higher unit speed in terms of efficiency; and lower pressure minima.

Yet another object of this invention is to propose a runner is more suitable for retrofit job at deteriorated available head than prior art or existing runner.

BRIEF DESCRIPTION OF INVENTION

According to this invention there is provided a runner blade for low specific speed Francis turbine comprising a set of nine profiles covering crown to skirt, each profile made up of a pressure curve and suction curve; both jointed at leading edge at one end and trailing edge at other end.

The runner passage consists of flow domain bounded by inlet, outlet crown (or hub) and skirt (also known as ring, band or tip). The flow domain has an array of blades equi-spaced circumferentially and extending between and interconnecting crown and skirt. The runner rotates about the turbine center line by the action of flow causing thrust on the blade surfaces. Water path is characterized by the dimensions D, the runner inlet diameter.

The runner is expressed in global Cartesian coordinate axis (x,y,z system; z aligned with turbine axis positive toward upward i.e., guide vane side). The water path is divided into a set of quasi-streamlines (r,z system $r=\sqrt{(x^2+y^2)}$). Each streamline is a projected view on (r,z) plane of blade profile. In (x,y) plane the blade profiles look like aerofoil sections having thicker and rounded leading edges at inlet and thinner, sharp trailing edges at outlet.

The runner consists of blade profiles with lower chord (about 15%) than that from prior art (existing runner). Invented profiles are slightly thinner (about 5%) with lower plan angle θmx−θmn (about 10°) with respect to prior art (note: $\theta=\tan^{-1}(-y/x)$). Prior art runner has S-shaped profiles.

DESCRIPTION WITH REFERENCE TO ACCOMPANYING DRAWINGS

The patent or application file contains at least one drawing executed in color. Copies of this patent or patent application publication with color drawing(s) will be provided by the Office upon request and payment of the necessary fee.

The nature of invention vis-à-vis prior art will be apparent from the following description made with reference to non-limiting exemplary embodiments of the invention represented in the accompanying drawings.

GEOMETRY AND FLOW FEATURES

Figure 4A:
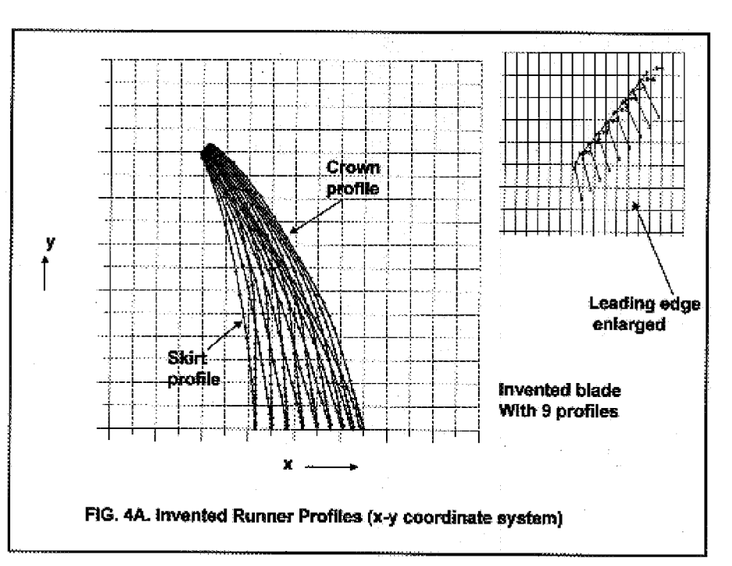
FIG. 4A Invented runner profiles (x-y coordinate system)

New runner blade (FIG. 4) have 9 profile sections to suit quasi-streamlines (FIG. 1B) and existing water path (FIG. 1A). There are 19 blades circumferentially equally spaced around the turbine axis and rotating with design rpm.

Figure 4B:
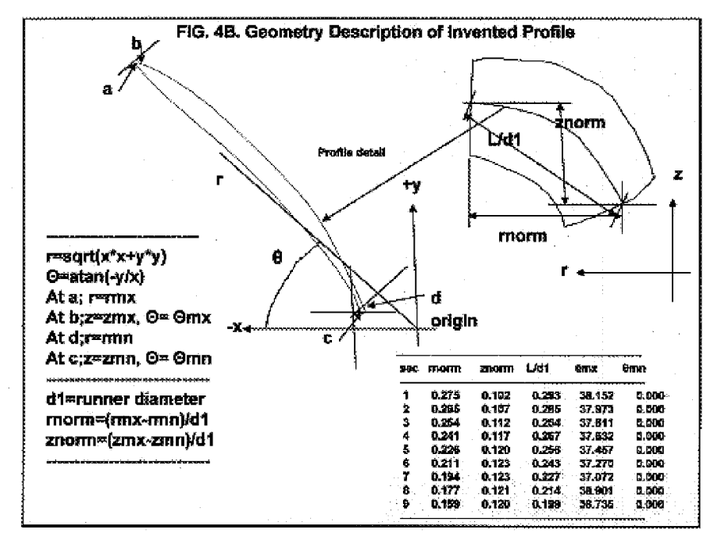
FIG. 4B Geometry Description of invented profiles.

Each of the sectional profile is made of two unique curves: pressure curve (lower one) and suction curve (top one); each starting from leading edge (at inlet flow side) and ending at trailing edge (at exit flow side). The characteristics of nine invented profiles are shown in FIG. 4B; in term of the parameters:
1. rnorm=(rmx−rmn)/d1
2. znorm=(zmx−zmn)/d1
3. L/d1
4. ηmx
5. ηmn Where rmx=Maximum value of r
rmn=Minimum value of r
zmx=Maximum value of z
zmn=Minimum value of z
θmx=Maximum value of θ
θmn=Minimum value of θ

Note with reference to FIG. 4B:
r=Polar radius=$\sqrt{(x^2+y^2)}$
$\theta=\tan^{-1}(-y/x)$ or atan (−y/x)
Sec=Profile section number (1 to 9, 1 for crown, 9 for skirt)
(x,y,z)=Cartesian coordinate system
(r,z)=Meridional plane.
(x,y)=blade-to-blade plane
d1 or D=runner diameter
L=Profile length $\sqrt{[(z_b-z_c)^2+(r_b-r_c)^2]}$
Suffix b,c refers to point at zmx and zmn:

The invented blade profiles has monotonous variation of rnorm (0.275–0.159), θmx (38.152–36.3735) and L/d1 (0.293–0.199) from crown to skirt profiles.

The value of θmn being zero; the variation of plan angles θmx-θmn is identical with that of θmx. znorm variation is between 0.102 and 0.123; with peak value is at $6^{th}$ and $7^{th}$ sections (FIG. 4B).

Figure 5:
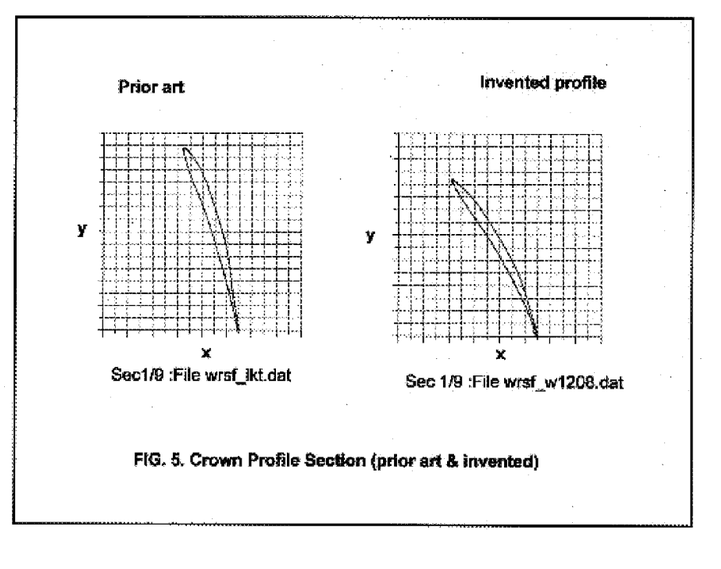
FIG. 5 Crown profile section (prior art and invented)
Figure 6:
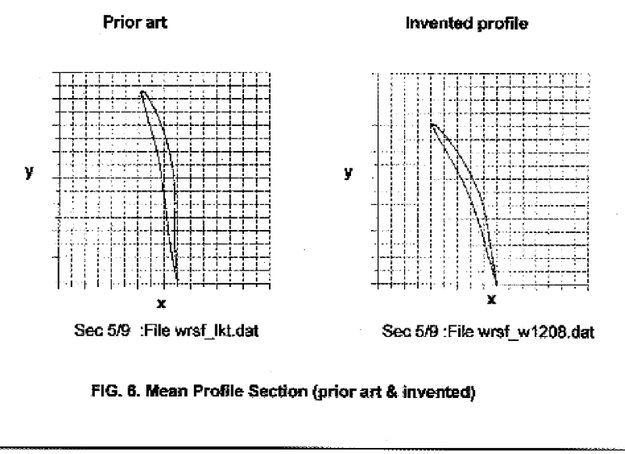
FIG. 6 Mean profile section (prior art and invented)
Figure 7:
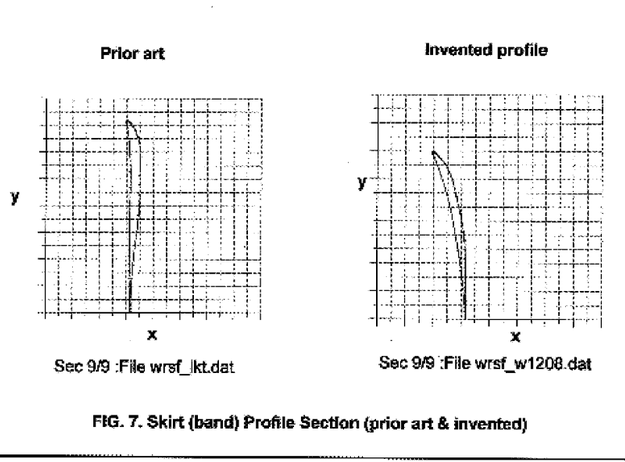
FIG. 7 Skirt (band) profile section (prior art and invented)
Figure 8:
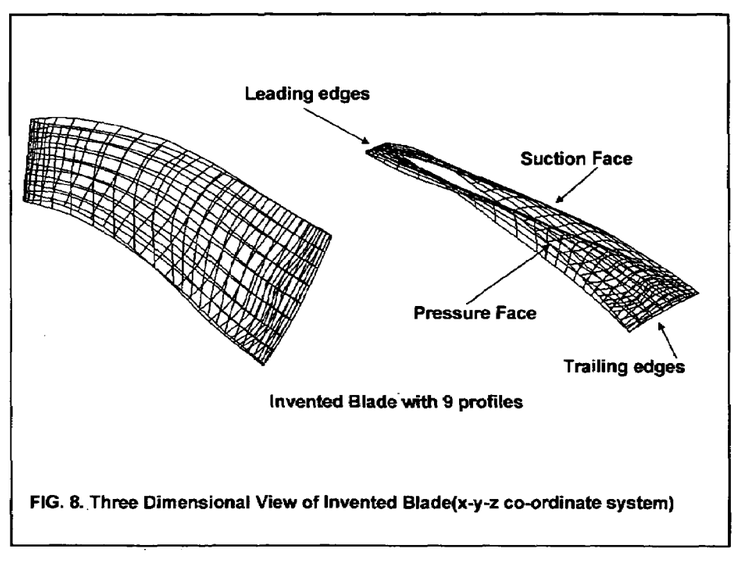
FIG. 8 Three dimensional view of the invented blade (x-y-z coordinate system)

Pictorial views of typical 3 profiles (Crown, mean and skirt) for prior art and invented ones are shown in FIGS. 5,6 and 7. The assembled three dimensional view of blade (made of 9 profiles) is shown in FIG. 8. The blade is made by stacking these 9 invented profiles joining the profile curves linearly.

Performance Simulation by Computational Fluid Dynamics (CFD)

Figure 9:
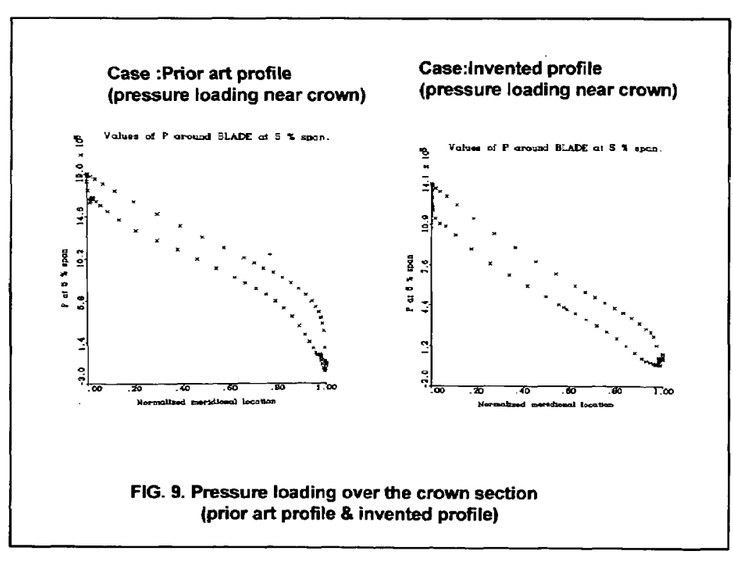
FIG. 9 Pressure loading over the crown section (Prior art profile and Invented profile)
Figure 10:
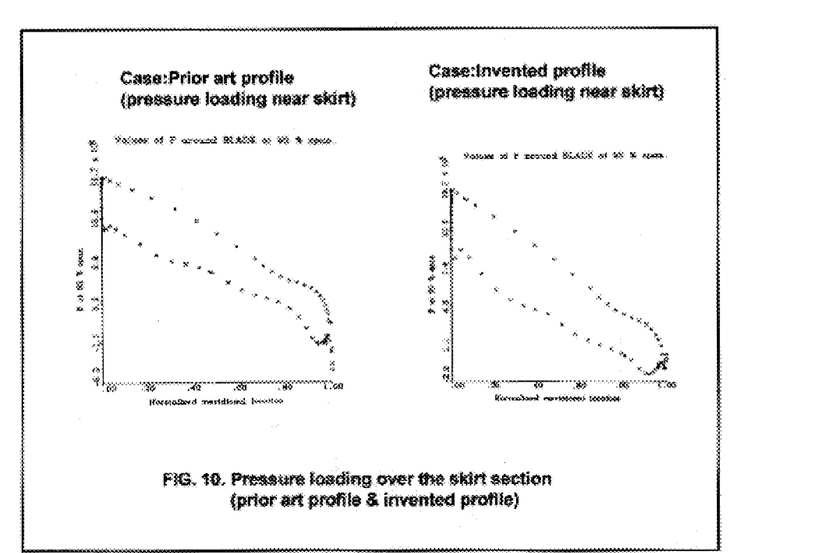
FIG. 10 Pressure loading over the skirt section (Prior art profile and invented profile)

The performance of invented blade as well as prior art with existing water path is simulated by CFD for given machine rpm (500) with water as fluid medium; for various guide vane openings. Two typical results depicted pressure loading for the inlet flow angle with respect to tangential direction α tg=13° over the crown section and over the skirt are shown in FIGS. 9 and 10; respectively. X-axis shows the normalized meridional distance over the profile (0 to 1.0; 0.0 at leading edge and 1.0 at trailing edge). Y-axis refers to surface pressure in N/m². The inlet flow angle with respect to tangential direction is α tg=13°. Two inferences can be drawn from FIGS. 9 and 10. The minimum pressure values are less negative in case of invented profiles indicating better cavitational characteristics. Typical results for discharge=3650 kg/s, rpm=500 are as follows (The head and efficiency values are based on runner water path with appropriate correction made for stationary component losses):

| | I. Case α tg = 12° | | | |
|---|---|---|---|---|
| Blade | $n_{11}$ | $q_{11}$ | Ns,m | Efficiency |
| Prior Art | 55.8 | 190.4 | 73.66 | 0.915 |
| Invented | 60.22 | 205.5 | 82.90 | 0.922 |
| | II. Case α tg = 13° | | | |
| Blade | $n_{11}$ | $q_{11}$ | Ns,m | Efficiency (eta) |
| Prior Art | 57.9 | 197.6 | 77.93 | 0.916 |
| Invented | 62.9 | 214.64 | 88.60 | 0.9247 |

-continued

| III. Case α tg = 14° | | | | |
|---|---|---|---|---|
| Blade | $n_{11}$ | $q_{11}$ | Ns,m | Efficiency (eta) |
| Prior Art | 59.9 | 204.3 | 81.86 | 0.915 |
| Invented | 65.415 | 223.23 | 93.94 | 0.924 |

| IV. Case α tg = 15° | | | | |
|---|---|---|---|---|
| Blade | $n_{11}$ | $q_{11}$ | Ns,m | Efficiency |
| Prior Art | 61.7 | 210.5 | 85.41 | 0.911 |
| Invented | 67.724 | 231.1 | 98.48 | 0.917 |

The prior art blade was to operate around a point say 'O' where q11=197.68 and n11=57.93. Due to aging of hydroset the available head H reduced such that the operation shifted to a point 'R' where q11=205.41 and n11=60.19 and efficiency is lower by 0.5%. It is obvious from the cases I–IV that invented blade for existing water path suits well for higher unit discharge and speed as needed for deteriorated head condition. The invented blade is more efficient and shows better cavitational characteristics for a range of ns,m=83–98. FIGS. 9 and 10 show better pressure loading throughout the profile length.

Figure 11A:
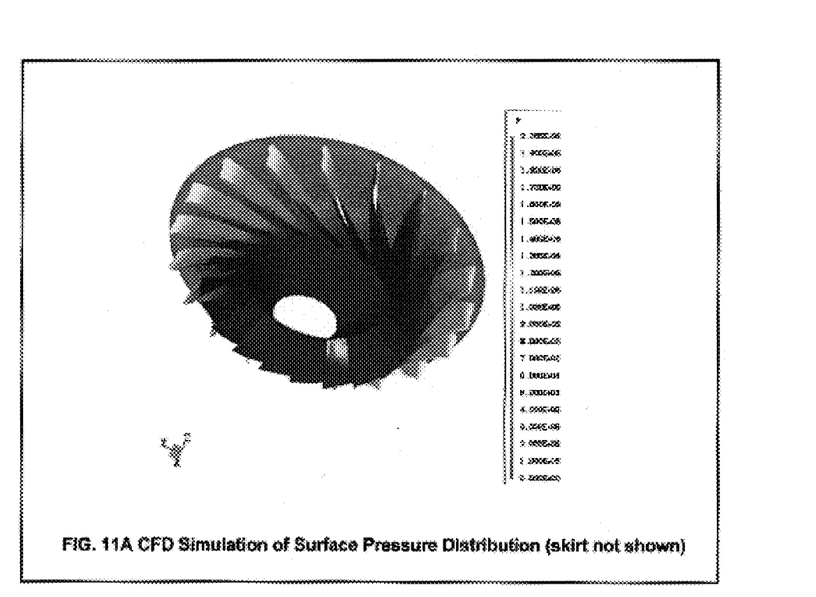
FIG. 11A CFD simulation of surface pressure distribution (skirt not shown)
Figure 11B:
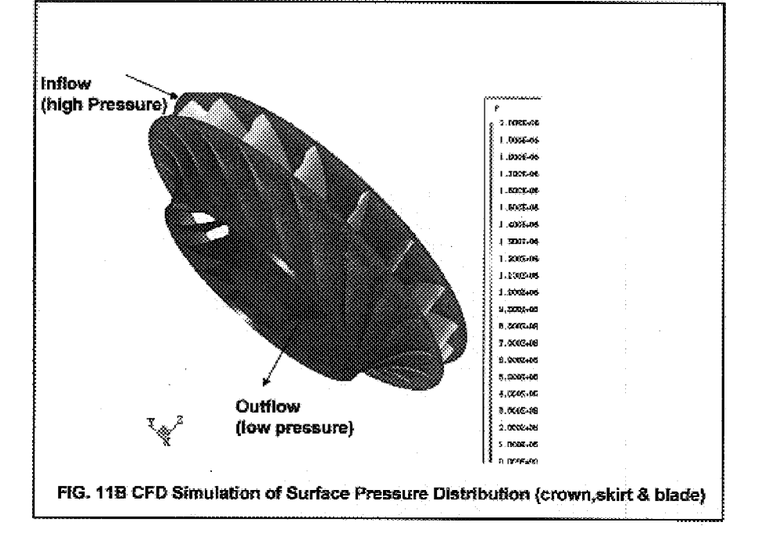
FIG. 11B CFD simulation of surface pressure distribution (crown, skirt & blade)

FIGS. 11A and 11B show typical pressure fringe plots over the runner as obtained by CFD simulation.

I claim:

1. A runner blade for low specific speed Francis turbine comprising a set of nine profiles covering crown, defining a first profile, to skirt, defining a ninth profile in accordance with Cartesian coordinate values X, Y, and Z and according to the Table 1, wherein each profile is made up of a pressure curve and a suction curve, both jointed at leading edge at one end and trailing edge at other end.

2. A runner blade as claimed in claim 1 for low specific speed application in a range of specific speed (ns,m) from 83 to 98 wherein a profile to profile variation, from crown to skirt, has a monotonous trend for normalized radial width (rnorm), with respect to a runner diameter, from 0.275 to 0.159, a leading edge polar angle (θmx) from 38.152 degrees to 36.735 degrees, and a normalized chord length (L/d1) from 0.293 to 0.199.

3. A runner blade as claimed in claim 1 wherein geometrical parameter znorm varies between 0.102 to 0.123 from profile to profile.

4. A runner blade as claimed in claim 1 wherein the variation from profile to profile of plan angles θmx-θmn is identical to that of θmx.

5. A runner blade as claimed in claim 1 wherein the peak values of axial width znorm is at sixth and seventh profiles of the nine profiles.

* * * * *

UNITED STATES PATENT AND TRADEMARK OFFICE
CERTIFICATE OF CORRECTION

PATENT NO.         : 7,210,904 B2                                        Page 1 of 2
APPLICATION NO.  : 10/901659
DATED              : May 1, 2007
INVENTOR(S)        : A. L. Chandraker It is certified that error appears in the above-identified patent and that said Letters Patent is
  hereby corrected as shown below:

Delete Drawing Sheet 4 of 8, and substitute therefor Drawing Sheet 4 of 8. (Attached)

Signed and Sealed this

Thirteenth Day of November, 2007

JON W. DUDAS
*Director of the United States Patent and Trademark Office*

FIG. 5. Crown Profile Section (prior art & invented)